(12) United States Patent
Ling

(10) Patent No.: US 6,876,979 B2
(45) Date of Patent: Apr. 5, 2005

(54) ELECTRONIC COMMERCE BRIDGE SYSTEM

(75) Inventor: Marvin T. Ling, Scottsdale, AZ (US)

(73) Assignee: Paybyclick Corporation, Phoenix, AZ (US)

(*) Notice: Subject to any disclaimer, the term of this patent is extended or adjusted under 35 U.S.C. 154(b) by 224 days.

(21) Appl. No.: 10/217,871

(22) Filed: Aug. 12, 2002

(65) Prior Publication Data

US 2004/0030605 A1 Feb. 12, 2004

(51) Int. Cl.[7] .............................................. G06F 17/60
(52) U.S. Cl. ......................................... 705/26; 705/39
(58) Field of Search .............................. 705/26, 27, 39, 705/78

(56) References Cited

U.S. PATENT DOCUMENTS 6,205,433 B1 * 3/2001 Boesch et al. ................. 705/26
6,535,880 B1 * 3/2003 Musgrove et al. ............ 707/10
6,567,850 B1 * 5/2003 Freishtat et al. ............. 709/224

FOREIGN PATENT DOCUMENTS

CA 2305233 * 10/2000

OTHER PUBLICATIONS

Business Wire, May 1, 2002, "EasyLink and Cyclone Commerce Team Up to Provide Enhanced EDIINT Services for Enterprises; Hybrid Solution Enables Connectivity Between all Trading Partners".*

* cited by examiner

Primary Examiner—Richard Chilcot
(74) Attorney, Agent, or Firm—Nicola A. Pisano, Esq.; Luce, Forward, Hamilton & Scripps LLP

(57) ABSTRACT

Systems and methods are provided for supporting electronic commerce in an environment in which multiple service providers each have associated vendors and in which a user may maintain an account at a service provider that is different from the service provider associated with the vendor from which a user makes an on-line purchase. Both tangible products and electronic content products may be sold using the system. A bridge computer may be used to facilitate interactions between service providers. The bridge computer may be used to implement service charge fees, to reimburse service providers for credit card transaction fees, to reimburse service providers with appropriate referral fees, and to otherwise support operation of the system.

13 Claims, 6 Drawing Sheets

US 6,876,979 B2

ELECTRONIC COMMERCE BRIDGE SYSTEM

BACKGROUND OF THE INVENTION

This application relates to electronic commerce systems and, more particularly, to systems for facilitating electronic commerce in environments with multiple service providers.

On-line vendors sell a variety of products over the Internet. Users with web browsers may browse a vendor's web site and may purchase products directly from the vendor. Service providers associated with Internet portal sites have attempted to capitalize on their large established user bases by establishing on-line shopping services. These shopping services allow users to shop at multiple vendors without having to establish multiple accounts. Rather, a user may establish a single account with the service provider that is then debited whenever a user shops at one of the vendors associated with that service provider.

Problems with this type of system arises because there are many competing service providers. As a result, users who desire to shop at a vendor that is not associated with a service provider at which they have already established an account are faced with the task of establishing additional user accounts. This is burdensome on the users and discourages purchases.

It is an object of the present invention to provide e-commerce systems that allow users to shop at vendors associated with different service providers without having to establish multiple service provider accounts.

SUMMARY OF THE INVENTION

This and other objects of the invention are accomplished in accordance with the principles of the invention by providing ways in which to allow a user to purchase products from a vendor that is associated with a service provider without requiring the user to have established an account with that service provider. The user may establish an account through one service provider and may use that account to shop at vendor web sites that are associated with different service providers. A bridge computer may be used to support purchase transactions and to facilitate interactions between different service providers.

The bridge computer may be used to maintain information on which vendors are associated with which service providers. The bridge computer may act as a clearinghouse for transactions, so that rival service providers need not interact directly with one another. When a user makes a purchase, the bridge computer may be used to debit the user's account at the appropriate service provider. The user need not know which vendors are associated with a particular service provider.

Funds may be credited to the account of the vendor from which the user is purchasing a product. The service provider with which the vendor is associated may receive a portion of the proceeds from each sale. When the user has an account with one service provider but makes a purchase from a vendor that is associated with another service provider, a referral fee may be paid by the service provider that is associated with the vendor to the service provider at which the user has the account. The bridge computer may be used to facilitate payment of the referral fee.

Service providers that have incurred credit card service charges on behalf of users who were depositing funds into their accounts by credit card may be reimbursed for those charges when purchase transactions are made by those users at vendors associated with other service providers. The bridge computer may also be used to impose a service charge (e.g., on a per-transaction basis or using any other suitable scheme). At the end of each month (or week or other suitable time period), the bridge computer may be used to settle the accounts in the system. The bridge computer may settle accounts by crediting and debiting appropriate parties. For example, the bridge computer may be used to settle accounts by creating electronic or paper invoices for parties who owe funds and by making electronic payments or generating paper checks for parties that are owed funds.

Further features of the invention, its nature and various advantages will be more apparent from the accompanying drawings and the following detailed description of the preferred embodiments.

DETAILED DESCRIPTION OF THE PREFERRED EMBODIMENTS

Figure 1:
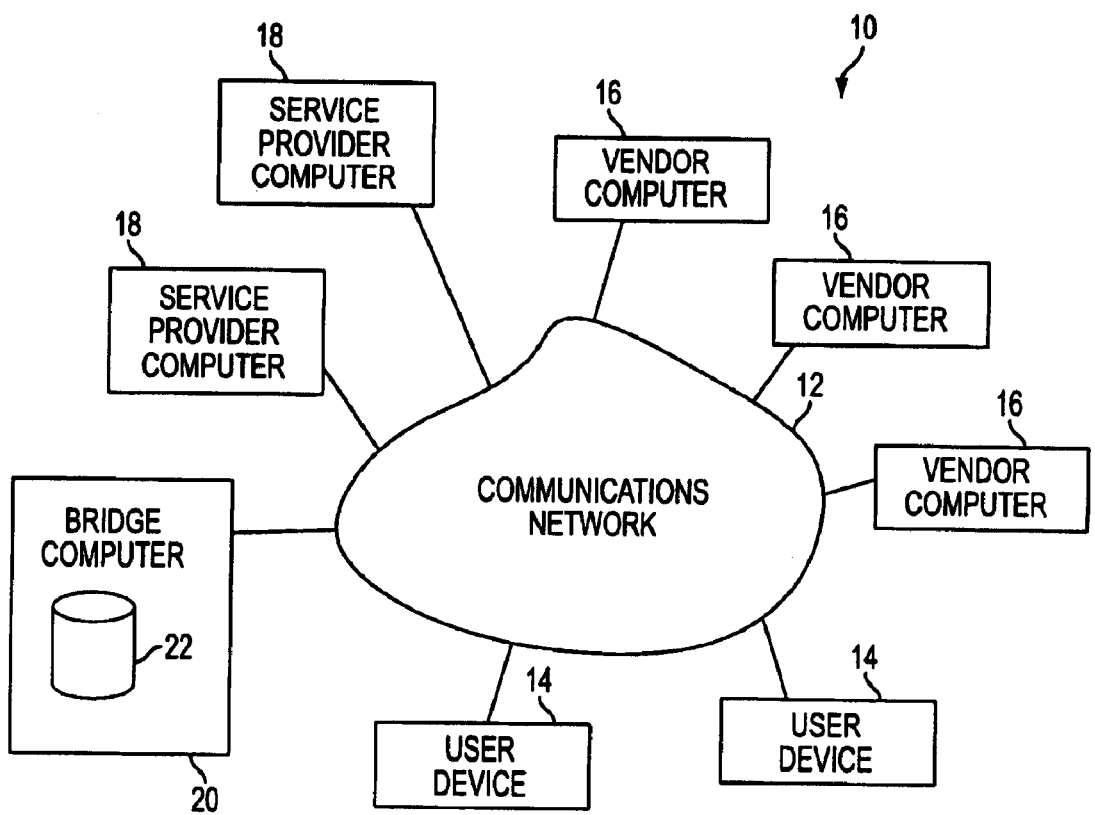
FIG. 1 is a simplified block diagram of an illustrative system having a bridge computer in accordance with the present invention.

An illustrative system 10 for supporting electronic commerce in accordance with the invention is shown in FIG. 1. System 10 may be used to allow users to purchase any suitable types of tangible or intangible products. Tangible products that are purchased with system 10 may be delivered by mail. Intangible products such as audio, video, or text products, or computer programs may be delivered electronically.

The various entities in system 10 may communicate using communications network 12. Communications network 12 may be based on the Internet, local area networks, wide area networks, private networks, or any other suitable networks that support communications between different parties located at respective computers or other suitable electronic devices.

Users may use user devices 14 to browse for products at vendor web sites on vendor computers 16 over communications network 12. User devices 16 may be desktop or notebook personal computers, personal digital assistants, wireless telephones, or any other suitable user devices. Product offerings on vendor computers 16 may be provided in the form of web pages organized into web sites. Internet web browsers on user devices 16 may be used to allow the users to browse the web content on vendor computers 16.

In the arrangement of system 10, intangible content may be owned by content owners (e.g., record companies, movie studios, publishing companies, or on-line newspapers). The content that is owned by the content owners may be made available for downloading using vendor computers 16 or may be available for downloading using content provider computers that are separate from vendor computers 16. Such content provider computers are not shown separately from vendor computers 16 in FIG. 1 to avoid over-complicating the drawings.

Vendors at vendor computers 16 may sell any suitable products. For example, one vendor 16 may sell intangible products such as electronically-downloadable songs or tangible products such as compact discs to be delivered by mail. Another vendor may sell shoes or clothing. Yet another vendor may sell books.

Service providers associated with service provider computers 18 may be used to provide Internet services for users. Different service providers may provide different levels of service. For example, some service providers may serve primarily as content aggregators. A service provider of this type may maintain a virtual presence on the web in the form of a web site. The web site may serve as a portal by offering access to many different types of Internet content and services. Access may be provided by providing web links to sites of interest and by hosting original content and services.

Another service provider may serve the same portal function and in addition may offer on-line access to customers (e.g., broadband or dial-up Internet access using an Internet account associated with the service).

These different types of service provider are referred to collectively herein as "service providers" or "Internet service providers."

Vendors may be associated with particular service providers. For example, some vendors may register with a service provider. Registered vendors may be featured in an on-line mall or shopping area of the service provider's web site. A user may establish an account at the service provider. Once the account has been established, the user may purchase products from associated vendors without registering individually with each associated vendor.

Bridge computer 20 and its database 22 may be used to allow the user registered with a particular service provider to purchase products from a vendor that is associated with a different service provider as well as the service provider with which the user has established the account. Bridge computer 20 therefore allows users to shop more easily at a wide variety of vendors without being forced to repeatedly register at different web sites.

Information on the amount of funds stored in the user accounts associated with various service providers may be maintained using database 22 of bridge computer 20. Vendors may register with or otherwise affiliate with particular service providers. Service provider computers 18 may be used to support on-line registration of vendors over communications network 12 if desired. Information on the vendors that have associated with a particular service provider may be maintained by bridge computer 20 (e.g., in database 22). For example, information may be stored in database 22 that identifies vendors 1, 2, and 3 as being associated with service provider 1 and that identifies vendors 4, 5, and 6 as being associated with service provider 2. A vendor identifier (vendor ID) may be used to identify each vendor. The vendors associated with each service provider may be listed in database 22 by vendor ID.

A user may become associated with a particular service provider by setting up an account. A user may, for example, browse directly to the service provider's web site to set up the account. A user may also be automatically provided with an opportunity to set up an account. For example, when a user without a suitable service provider account first attempts to purchase a product from a vendor associated with a particular service provider, bridge computer 20 may be used to set up the user's account at that particular service provider.

Database 22 may store information on user accounts. This information may include a listing of which users have accounts with each service provider. If a user establishes an account at a particular service provider, the user's account information (e.g., user identifier and password, account balance, etc.) may be stored in a database that is accessible by that user's service provider. The user's service provider may use the user account information in database 22 as a primary or as a backup source of information on the users' accounts. Other service providers may be prevented from directly accessing or adjusting information in such user accounts (e.g., user balance information, etc.). User account funds may be held in a financial institution associated with the service provider or in any other suitable account management system. To avoid over-complicating the drawings, such additional financial institutions are not shown separately in FIG. 1.

Figure 2:
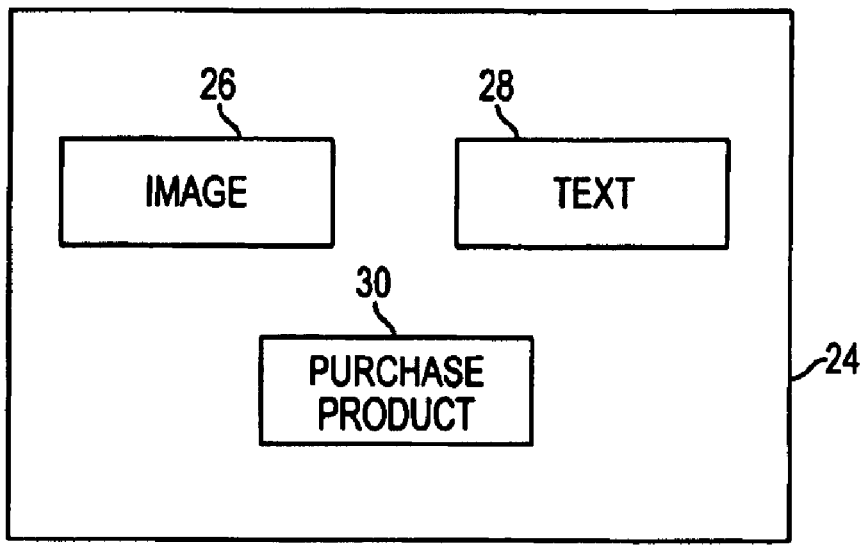
FIG. 2 is an illustrative screen that may be displayed when a user is browsing the web site of a vendor to locate products to purchase in accordance with the present invention.

In a typical purchase transaction, a user may browse the Internet to locate a product of interest at a vendor's web site. A typical web page that may be displayed for the user after the user has located a product of interest is shown in FIG. 2. The web page shown on the user's monitor or screen 24 of FIG. 2 includes an image 26 (e.g., an image of the product), text 28 (e.g., a product description) and a selectable option 30 (e.g., a "purchase product option"). When the user expresses interest in purchasing the featured product by clicking on option 30, a screen such as screen 32 of FIG. 3 may be displayed for the user on the user's device 14.

Figure 3:
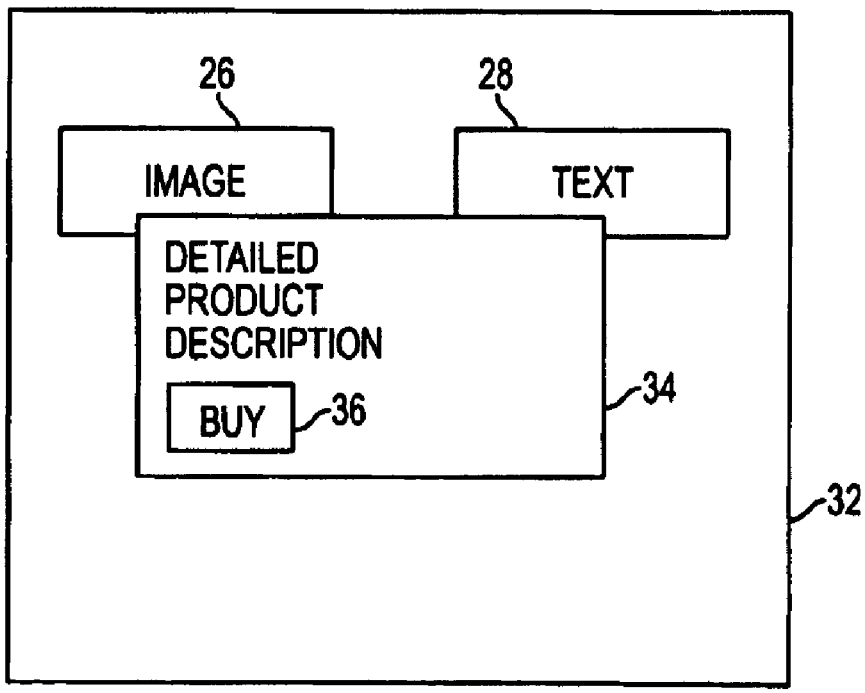
FIG. 3 is an illustrative screen that may be displayed when a user selects a purchase product option of the type shown in FIG. 2 in accordance with the present invention.

In the example of FIG. 3, image 26 and text 28 are still displayed. Pop-up product ordering window 34 (a "buy" window) containing buy option 36 is displayed on top of image 26 and text 28. This is merely one illustrative arrangement. Any suitable web page or pages or screen arrangement may be provided to the user to allow the user to access content of the type shown in buy window 34 or other suitable product ordering features if desired. The user may click on buy option 36 (or may select buy option 36 using any other suitable technique) to purchase the desired product.

With one suitable arrangement, buy window 34 may be displayed by bridge computer 20. After the user has navigated to the vendor's web site, the user may click on purchase product option 30 (which may be, for example, a web link). Clicking on option 30 causes vendor computer 16 to launch a SOAP (Simple Object Access Protocol) call or other appropriate software. This connects the user to bridge computer 20 to proceed with the purchase transaction. Information that identifies the vendor (e.g., a vendor identifier or vendor ID) and information that identifies the product of interest (e.g., a product identifier or product ID), and other information for the product (e.g., a product description, price information, and other information that may be displayed in buy window 34) may be provided to the bridge computer when the SOAP call is made.

Figure 4:
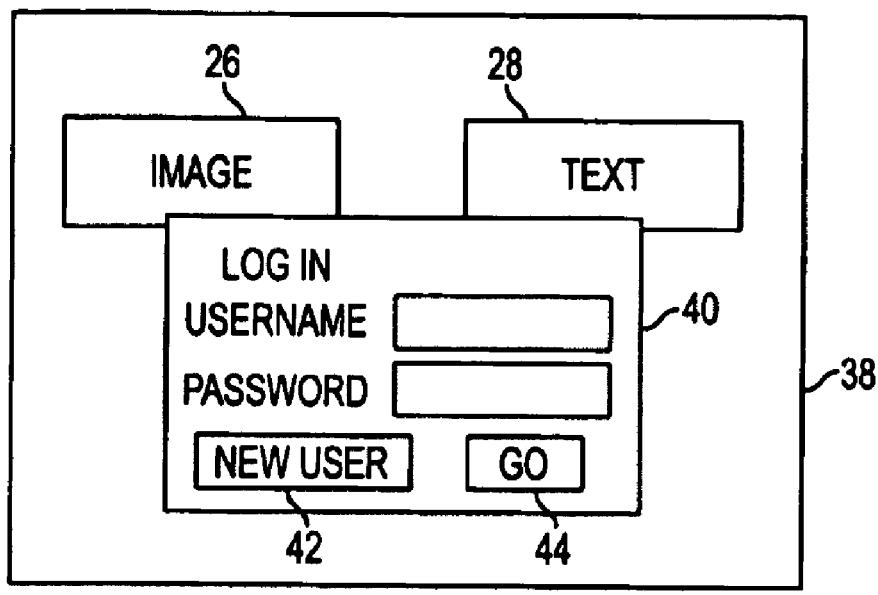
FIG. 4 is an illustrative screen that may be displayed to allow a user to log in to the system in accordance with the present invention.

If the user is not logged in with an existing user account, bridge computer 20 may provide the user with an opportunity to log in. Bridge computer 20 may, for example, display a login window 40 on the user's screen, as shown in FIG. 4. Login window 40 may contain regions that allow the user to enter the user's username and password or other suitable authentication information. When the user has finished entering the required information, the user may press enter or select go option 44. The username and password or other suitable user information (user ID) may be provided to bridge computer 20 to identify the user. If the user is a new user, the user may select new user option 42.

Selecting new user option 42 directs bridge computer 20 to provide the user with an opportunity to establish a new account. The new account will be associated with the service provider that is associated with the vendor at which the user is shopping (or, if the user is setting up an account directly through a service provider web site, the account will be associated with that service provider). The new account set up process allows the user to select a desired username and password (or other suitable authentication information). The user may also add funds to the account. Any suitable technique may be used to add funds to the account. For example, the user may add funds by credit card deposit, by electronic transfer from an existing account (e.g., an account associated with another service provider, a telephone company, financial institution, or other entity), or by a check or cash deposit. Funds may be maintained in the form of currency or tokens (credits). Information on the user account, the particular service provider with which the user is associated, and other account information (e.g., the amount of funds on deposit, etc.) may be maintained in database 22 of bridge computer 20. Some or all of this information may also be stored on the appropriate service provider computer 18.

Figure 5:
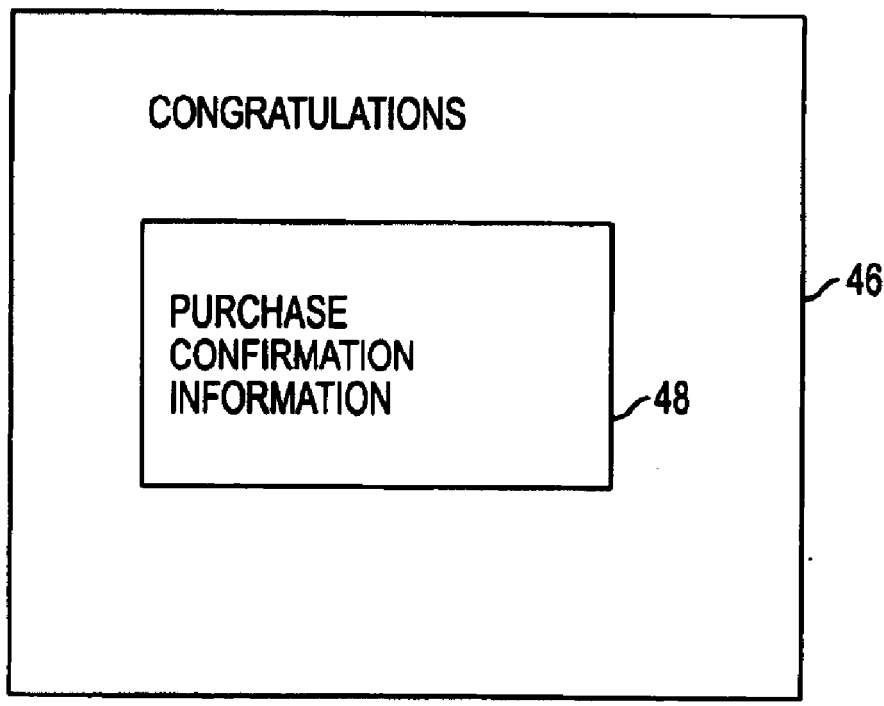
FIG. 5 is an illustrative screen that may be displayed for a user when the user has purchased a product in accordance with the present invention.

After the user logs in (or if the user had already been logged in), the purchase transaction may proceed. The purchase amount may be deducted from the user's account and a purchase confirmation may be provided to the user. Illustrative purchase confirmation 48 is shown as being displayed on illustrative screen 46 on a user device in FIG. 5. The screens such as screens 24 (FIG. 2), 32 (FIG. 3), 38 (FIG. 4), and 46 (FIG. 5) are merely illustrative examples. Information on the product ordering process may be displayed for the user at user device 16 using any suitable format and using any suitable number of screens.

To consummate a purchase transaction, the vendor processes the user's order (e.g., to confirm the desired appropriate delivery method) and receives a credit for the amount of the user's purchase amount. The vendor may receive the funds for the purchase from the service provider that is associated with that vendor. The user's actual funds may be on deposit with either that service provider (i.e., the service provider that is associated with the vendor) or with another service provider (i.e., a service provider that is not affiliated with that vendor).

During the purchase transaction, bridge computer 20 determines the identity of the service provider at which the user's account is maintained. The bridge computer uses the information on the identity of the vendor that is selling the product and the associations between various vendors, service providers, and user accounts that is stored in database 22 to determine whether the service provider associated with the vendor at which the user is purchasing the product is the same as the service provider at which the user has his account or is a different service provider.

If the user has an account at the service provider associated with the vendor from which the product is being purchased, that account may be debited appropriately, the vendor's account may be credited, and the bridge may charge a service charge for the transaction.

If the user has an account at a different service provider, bridge computer 20 may transfer funds from that service provider account to the service provider with which the vendor is associated (who then pays the vendor). This allows the vendor to be paid for the purchase, even though the vendor is not associated with the service provider at which the user has the account and even though the service provider that is associated with the vendor is different from the user's service provider.

Bridge computer 20 may allocate funds between service providers using any suitable scheme. For example, the service providers may each have accounts at bridge computer 20 that are reconciled at the end of each month (or other suitable time period). As another example, funds may be transferred electronically between the user's service provider and the vendor's associated service provider in real time. Funds may also be transferred directly from the user's account to the vendor. These are merely illustrative examples. Any suitable approach for allowing the user to use funds at the user's account when the service provider associated with that account differs from the service provider associated with the vendor at which the user is purchasing the desired product may be used if desired.

Figure 6:
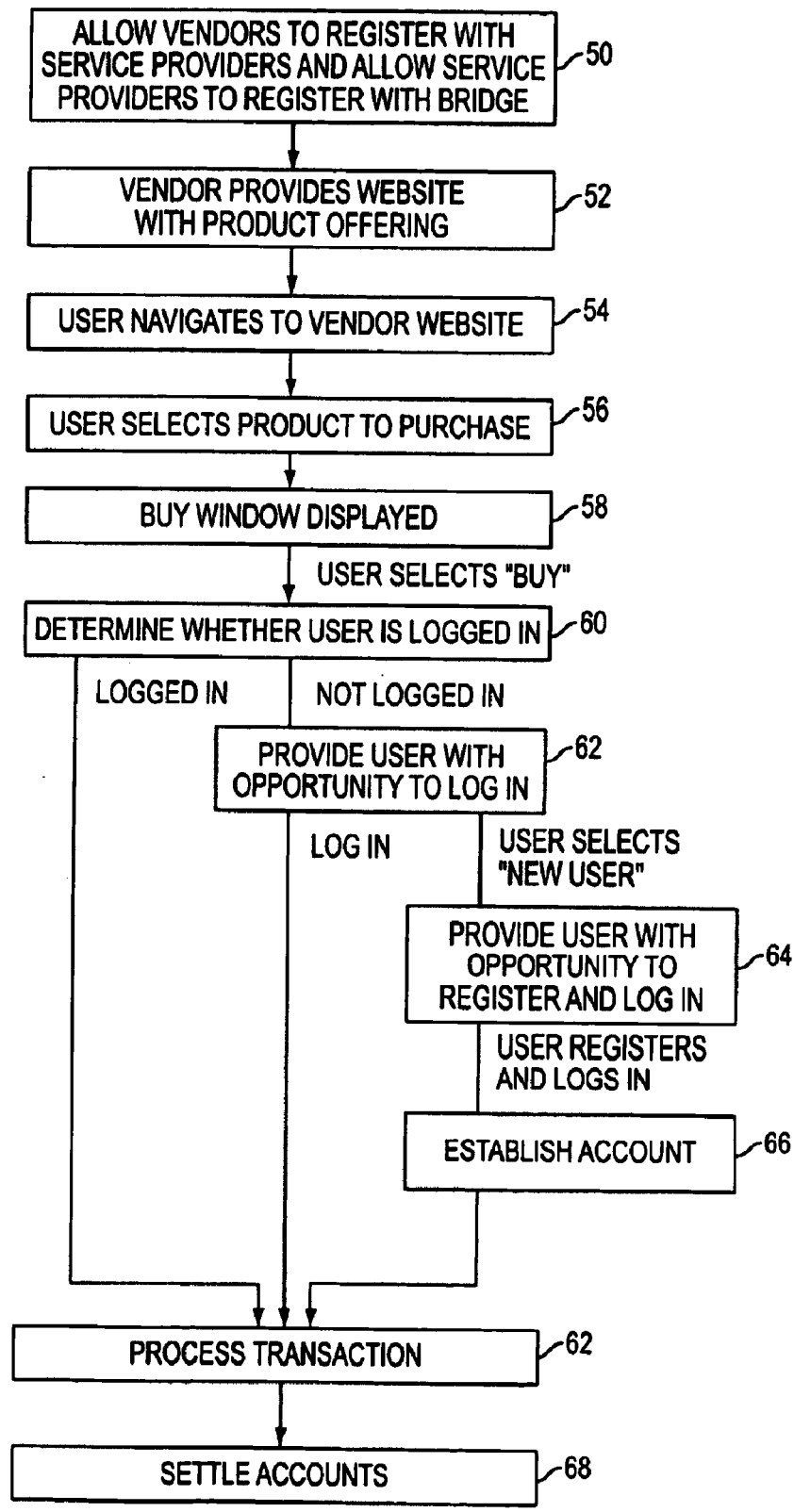
FIG. 6 is a flow chart of illustrative steps involved with using the system of FIG. 1 to support purchase transactions in accordance with the present invention.

Illustrative steps involved in using system 10 to support a purchase transaction are shown in FIG. 6. At step 50, each vendor may register with a particular service provider. Vendors may or may not be allowed to register with more than one service provider. The service providers may register with the bridge service. The registration processes of step 50 may be handled manually or automatically by using computers 16, 18, and 20 to support on-line registration functions.

After the relationships between vendors and service providers have been established and after information on these relationships has been gathered and stored in database 22 of bridge computer 20, vendors may make products available for purchase at step 52. Vendors may, for example, provide web sites using vendor computers 16. The web sites may be accessed by the users at user devices 14 over communications network 12 at step 54.

When a user has used a web browser or other suitable arrangement to navigate to a desired product for purchase, the user may select a suitable purchase option (such as purchase option 30 of FIG. 2) at step 56.

When the product purchase option is selected, the vendor computer passes information such as a vendor ID, product ID, and buy window information to bridge computer 20.

Bridge computer 20 uses this information to display a buy window such as buy window 36 of FIG. 3 or other suitable screen to the user at step 58.

After the user selects a buy option such as buy option 36 of FIG. 3, bridge computer 20 determines whether the user is logged in at step 60. Information on the user's status (whether or not the user is logged in) may be maintained by bridge computer 20.

If the user is logged in, the purchase transaction may be processed at step 62. Once a user is logged in, any suitable number of purchase transactions may be processed using steps 54, 56, 58, 60, and 62 without requiring the user to log in another time.

If it was determined at step 60 that the user has not logged in, bridge computer 20 may be used to provide the user with an opportunity to log in at step 62. If the user already has an account at a service provider, the user may log in and the purchase transaction may be processed at step 62. If the user is a new user and selects new user option 42 (FIG. 4), bridge computer 20 may provide the user with an on-line opportunity to establish a new account at step 66. The process of establishing a new account may involve, for example, selecting an appropriate username and password or other authentication information, depositing funds in the account, etc. Funds may be deposited by credit card, by transfer from another account, by check or cash (e.g., by mail), or using any other suitable technique. Funds may be maintained in currency or tokens or any other suitable format or a combination of such formats. Because the user is a new user, bridge computer 20 will preferably establish the new account at the service provider that is associated with the vendor at which the user is attempting to purchase the product that was selected at step 56. After the new account has been established and the user is logged in, the purchase transaction may be processed at step 62.

Periodically (e.g., once per day, once per week, once per month, or in real time or at any other suitable interval) the accounts of the vendors, service providers, and bridge may be settled at step 68.

Figure 7:
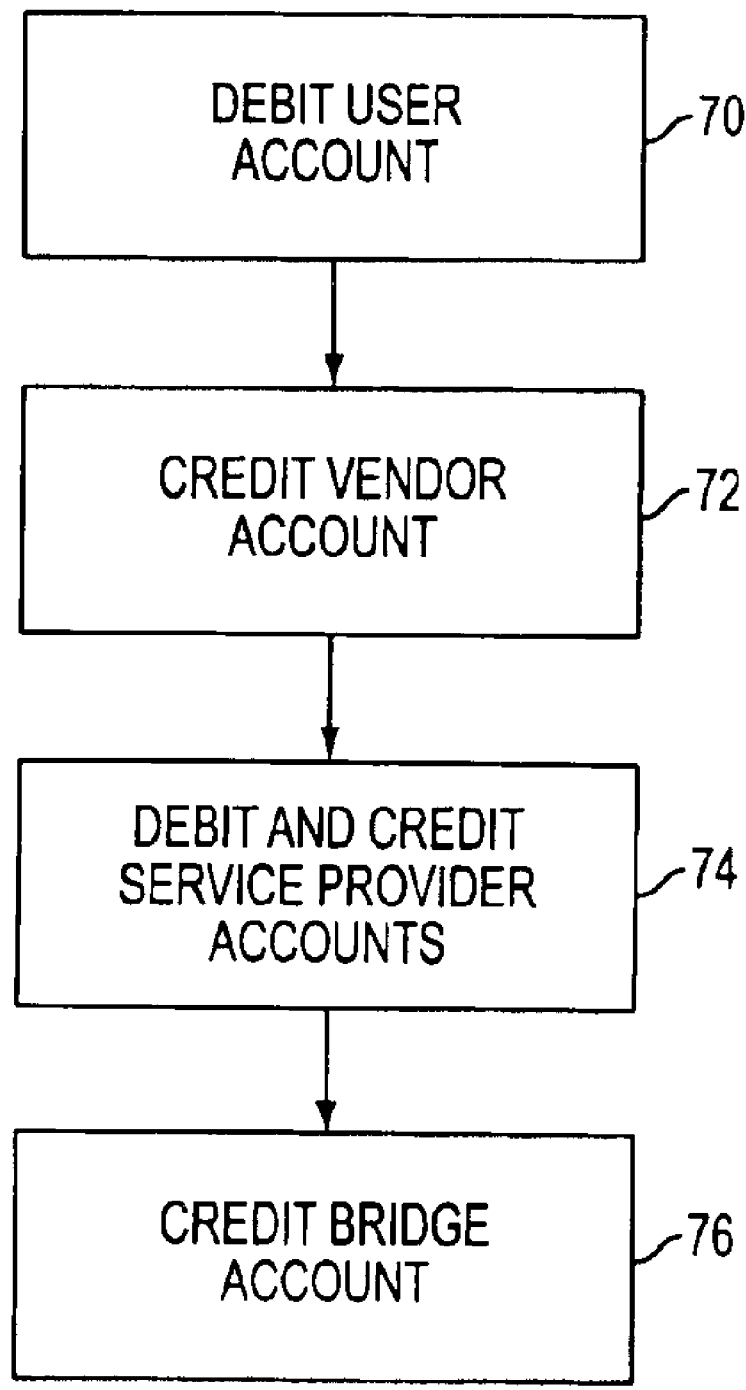
FIG. 7 is a flow chart of illustrative steps involved in supporting purchase transactions that involve multiple service providers in accordance with the present invention.

Illustrative steps involved in the transaction processing of step 62 of FIG. 6 are shown in FIG. 7. When the user clicks on a suitable option such as buy option 36 of FIG. 3, the user's account balance is checked to determine whether the user has sufficient funds to cover the desired purchase. Information on the user's account balance may be maintained at bridge computer 20. This allows the vendor at which the user is purchasing the product to check in a central location (bridge computer 20) to determine whether the user has sufficient funds for the purchase. The vendor passes the vendor ID and product information (including price information) to the bridge. The bridge may obtain user information (e.g., user ID, password, etc.) directly from the user and may use the user information and information from the vendor to perform the account balance check. For example, bridge computer 20 may use the price information and the user ID to determine whether the user's account has sufficient funds to cover the purchase price. Information on the user's account balance may also be maintained at service provider computer 18 for the service provider with which the user has the account. If desired, the vendor may check the user's account balance through service provider computer 18. If the user does not have sufficient funds, the user may be provided with an opportunity to deposit additional funds (e.g., by credit card, by transferring funds from another account, by using a check or cash deposit, etc.).

If the user has sufficient funds to cover the user's desired purchase, the user's account is debited at step 70. The user's account balance information may be updated accordingly on bridge computer 20 and service provider computer 18. The user's account at the service provider may be debited, even if the user's service provider account is at a service provider that is not associated with the vendor at which the user is making the purchase.

At step 72, the vendor's account may be credited. The vendor may receive a credit in the form of an addition of funds or credit into the vendor's account at bridge computer 20 or at a computer maintained at any other suitable facility.

The funds or credit for crediting the vendor may be provided by the service provider with which the vendor is associated (i.e., the service provider with which the vendor had registered). Accordingly, at step 74, this service provider account is debited. If the user's account is at this service provider, the user's account deduction (step 70) will be used to reimburse the service provider for the funds the service provider transferred to the vendor to cover the purchase price. If the user's account is at another service provider (i.e., a service provider other than the service provider with which the vendor is associated), that service provider's account may be debited and the service provider account for the service provider associated with the vendor may be credited accordingly at step 74.

Bridge computer 20 may maintain service provider account balance information for handling fund transfers which involve multiple service providers. Because there are costs incurred in operating bridge computer 20, the bridge computer operator ("bridge") may levy a service charge or fee. The fee may be charged, for example, for each purchase transaction that involves a transfer between the user's service provider's account to the vendor's associated service provider's account when those accounts are at different service providers or may be a monthly charge or other periodic charge. These are merely illustrative examples. Any suitable scheme may be used by bridge computer 20 to levy or collect a service charge for handling transactions between different service providers. The service charge may be credited to an account maintained by bridge computer 20 at step 76.

Records of the debiting and crediting activities between accounts that are associated with each purchase transaction may be maintained by bridge computer 20 and by vendor computers 16 and service provider computers 18 (to the extent that the certain vendors and service providers are involved in these transactions). Accounts may be reconciled in real time or may be periodically settled (e.g., once per day, once per month, or according to any other suitable predetermined schedule).

Figure 8:
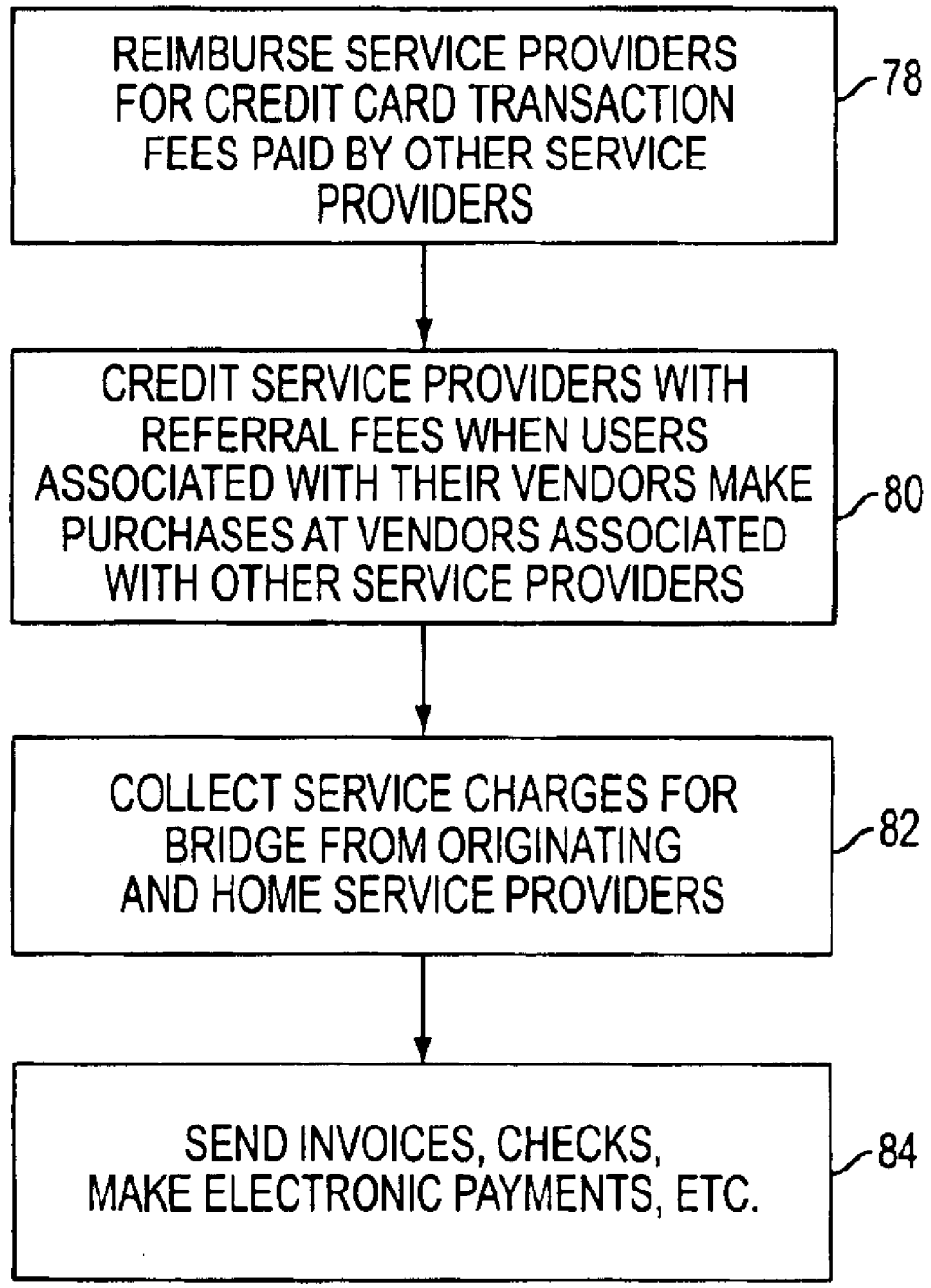
FIG. 8 is a flow chart of illustrative steps involved when the bridge computer is used to settle accounts in accordance with the present invention.

Illustrative steps involved in settling accounts maintained in system 10 are shown in FIG. 8. Credit card companies often charge a transaction fee or "load" to the merchant at which a user makes a credit card purchase. The charge, which may amount to 1–2% of the transaction total, is typically borne by the merchant as a cost of doing business. However, unfairness may result when one service provider maintains an account for a user and that user makes purchases at vendors associated with other service providers. Accordingly, during the account settlement process (or at any other suitable time), the credit card company's transaction fee and "load" charge may be reimbursed to the appropriate service providers. This allows system 10 to remove the financial disincentive that would otherwise be faced by a service provider when it accepts a credit card fund deposit from a user and pays the credit card service fee for the user (as an expected cost of doing business) but eventually transfer those funds to another service provider (i.e., to credit that other service provider because it was the service provider associated with the vendor at which the user makes a purchase). Without a reimbursement scheme, the service provider associated with the vendor at which the user makes a purchase stands to profit (e.g., by 5–50% of the sales price) from the purchase at the associated vendor, even though that service provider never had to incur the credit card service fee imposed by the credit card company when the user deposited funds. The step of reimbursing the service provider that incurred the credit card company service fee without benefiting directly from the vendor's sale is shown as step 78 of FIG. 8. This step may be performed (e.g., using bridge computer 20) as part of the account settlement process or, if desired, it may be implemented in real time (e.g., at an earlier stage of the purchase transaction). These are merely illustrative examples of how system 10 may take into account the fair distribution of credit card company service charges. Any suitable scheme for distributing such charges fairly among the parties of system 10 may be used.

Some service providers may have a large number of associated users. Such users may, for example, be loyal users of the news services or e-mail service provided by or associated with the portal web site supported by a given service provider. These service providers may therefore tend to generate and maintain large numbers of user accounts. Using bridge computer 20 and system 10, service providers with large user bases may obtain referral fees from other service providers when their users shop at vendor web sites that are associated with such other service providers. The referral fee scheme may also be implemented in a reciprocal fashion (e.g., to reimburse smaller service providers when their users purchase products at the vendors associated with larger service providers).

Bridge computer 20 may be used to maintain referral fee information in database 22. Each purchase transaction originates at a vendor. Database 22 may be used to maintain information on which service provider is associated with the user's account. Database 22 may also maintain information on vendor affiliations. When a user purchases products from a vendor that is associated with the same service provider at which the user is maintaining an account, no service-provider-to-service-provider fees are due. When, however, a user purchases products from a vendor that is associated with a service provider other than the service provider at which the user is maintaining his account, the service provider who is maintaining the account may be entitled to a referral fee from the service provider who benefited directly from the sale (e.g., by obtaining a portion of the vendor's profit on the sale). The referral fee schedule that is used may be different for different service providers and may or may not be implemented at bridge computer 20. The process of crediting appropriate service providers with referral fees is shown as step 80 of the settlement process steps of FIG. 8, but this process may be performed at any suitable stage of the purchase transaction process or operation of system 10 if desired. Moreover, bridge computer 20 may, if desired, maintain raw purchase statistics that may be used by service providers 18 in determining what referral fees should be paid to each other. The use of bridge computer 20 to implement the service provider account debiting and crediting associated with the service provider referral fee scheme is optional. If bridge computer 20 is used to maintain referral fee information for the service providers, bridge computer 20 may do so by updating the service provider accounts in database 22 appropriately during the settlement process (or at any other suitable time).

As shown by step 82, bridge computer 20 may be used to gather service charges. Such service charges may be levied on a per-transaction basis or may be levied on a monthly basis (or according to any other suitable predetermine schedule). The transaction fees may serve to offset the costs associated with operating bridge computer 20 and the services associated with system 10. Service charges may be charged for purchase transactions that originate at a vendor that is associated with the user's service provider and for purchase transactions that originate at vendors that are associated with other service providers. If desired, the service charges for each of these two types of transactions may be different.

At step 84, accounts may be settled (e.g., at the end of the month) by electronic funds transfers to and from the appropriate entities (e.g., service providers) or by invoicing entities (e.g., service providers) that owe money and by mailing checks to entities (e.g., service providers) that are owed money. If desired, vendor accounts may be settled at the same time that service provider accounts are settled (e.g., at the end of each month or according to any other suitable schedule). Alternatively, vendor's may be provided with funds in real time to cover each purchase, so that vendors do not need to advance funds for the service providers. These arrangements or any other suitable arrangements may be used to reconcile accounts between service providers and vendors, between service providers, and between service providers and the bridge and between users and other entities.

The foregoing is merely illustrative of the principles of this invention and various modifications can be made by those skilled in the art without departing from the scope and spirit of the invention.

The invention claimed is:

1. A method for using an electronic commerce system having a bridge computer to allow a user at a user device to make a product purchase at a purchase price from a given vendor having a web site provided by a vendor computer over a communications network, wherein the vendor is associated with at least one of a plurality of service providers wherein each of the plurality of service providers has a service provider computer, and wherein the user has a user account maintained by at least one of the plurality of service providers, the method comprising:

debiting the user's account by the purchase price when the user purchases the product from the given vendor;

determining from among the plurality of service providers, using the bridge computer, whether the given vendor is associated with the same service provider with which the user's account is maintained or is associated with a different service provider; and if the service provider with which the user's account is maintained is the same as the service provider with which the vendor is associated, crediting the given vendor by the purchase price using funds from the user's account at that same service provider and, if the service provider with which the user's account is maintained is different from the service provider with which the vendor is associated, crediting the given vendor by the purchase price using funds from the service provider with which the vendor is associated and using the bridge computer to reimburse that service provider with the purchase price using funds from the user's account.

2. The method defined in claim 1 further comprising using the bridge computer to reimburse service providers for credit card service charge fees paid by other service providers.

3. The method defined in claim 1 further comprising crediting service providers with referral fees when users associated with those service providers make purchases at vendors associated with other service providers.

4. The method defined in claim 1 further comprising using the bridge computer to collect a service charge for a bridge operator for the product purchase.

5. The method defined in claim 1 further comprising using the bridge computer to settle accounts between service providers according to a predetermine schedule.

6. The method defined in claim 1 further comprising using the bridge computer to maintain a database that contains information on which vendors are associated with which service providers.

7. The method defined in claim 1 wherein the vendor offers the product for sale on a web site and wherein the method further comprises using the bridge computer to provide the user at the user device with a screen that includes a buy option when the user selects an on-screen option indicating that the user desires to purchase the product.

8. The method defined in claim 1 further comprising: using the bridge computer to receive a vendor ID from the given vendor; and using the bridge computer to determine using the vendor ID whether the given vendor is associated with the same service provider with which the user has the account or at a different service provider.

9. The method defined in claim 1 further comprising:

using the bridge computer to receive a vendor ID from the given vendor and to receive a user ID from the user; and using the bridge computer to determine from the vendor ID and user ID whether the given vendor is associated with the same service provider at which the user has the account or at a different service provider.

10. The method defined in claim 1 further comprising using the bridge computer to allow a user without an account to create a new service provider account when that user attempts to purchase products from a vendor, wherein the new account is created with the service provider associated with that vendor.

11. The method defined in claim 1 further comprising using the bridge computer to maintain accounts for multiple service providers, wherein the bridge computer credits some of the service provider accounts and debits other service providers accounts to reimburse service providers that have incurred credit card transaction service charges when users deposit funds with those service providers using credit cards but whose funds are provided to other service providers in payment of products purchased through vendors associated with those other service providers.

12. The method defined in claim 1 wherein the product is a tangible product, the method further comprising using a web site on the vendor computer to offer the product for sale.

13. The method defined in claim 1 wherein the product is an intangible product, the method further comprising using a web site on the vendor computer to offer the product for sale.

\* \* \* \* \*